United States Patent
Pelliconi et al.

(10) Patent No.: US 6,599,986 B2
(45) Date of Patent: Jul. 29, 2003

(54) PROPYLENE POLYMER COMPOSITIONS HAVING IMPROVED IMPACT STRENGTH AND EXCELLENT OPTICAL PROPERTIES

(75) Inventors: Anteo Pelliconi, S. Maria Maddalena (IT); Päivi Helena Huovinen, Vimercate (IT); Maria Di Diego, Bologna (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/031,584

(22) PCT Filed: May 18, 2001

(86) PCT No.: PCT/EP01/05707
§ 371 (c)(1),
(2), (4) Date: Jan. 18, 2002

(87) PCT Pub. No.: WO01/92401
PCT Pub. Date: Dec. 6, 2001

(65) Prior Publication Data
US 2002/0156194 A1 Oct. 24, 2002

(30) Foreign Application Priority Data
May 31, 2000 (EP) .............................................. 00201931

(51) Int. Cl.$^7$ .................. C08L 23/00; C08L 23/04; C08L 23/10; B65D 1/00

(52) U.S. Cl. .................. 525/240; 428/35.7; 428/36.92

(58) Field of Search .................. 525/240; 428/35.7, 428/36.92

(56) References Cited

U.S. PATENT DOCUMENTS

| 4,399,054 A | | 8/1983 | Ferraris et al. | |
| 4,472,524 A | | 9/1984 | Albizzati | 502/113 |
| 4,634,740 A | | 1/1987 | Fujita et al. | 525/240 |
| 5,623,021 A | * | 4/1997 | Pelliconi et al. | 525/240 |
| 5,658,628 A | | 8/1997 | Ishii et al. | 428/36.92 |
| 5,994,482 A | | 11/1999 | Georgellis et al. | 526/65 |

FOREIGN PATENT DOCUMENTS

| EP | 0045977 | 2/1982 |
| EP | 0373660 | 6/1990 |
| EP | 0557953 | 9/1993 |
| WO | 9902604 | 1/1999 |

* cited by examiner

Primary Examiner—Nathan M. Nutter

(57) ABSTRACT

Propylene polymer compositions comprising (percent by weight): A) from 70 to 90% of a random copolymer of propylene with ethylene, containing from 1 to 6% of ethylene, having a content of fraction insoluble in xylene at room temperature (about 23° C.) of not less than 93%; B) from 10% to 30% of a copolymer of propylene with ethylene, containing from 8 to 18% of ethylene; wherein the ratio (B)/$C^2_B$ of the percent by weight of (B), with respect to the total weight of (A) and (B), to the percent by weight of ethylene in (B), with respect to the total weight of (B), represented in the above formula by $C^2_B$, is 2.5 or lower.

6 Claims, No Drawings

PROPYLENE POLYMER COMPOSITIONS HAVING IMPROVED IMPACT STRENGTH AND EXCELLENT OPTICAL PROPERTIES

The present invention relates to new propylene polymer compositions having improved impact strength and excellent optical properties.

As is known, the isotactic polypropylene is endowed with an exceptional combination of excellent properties which render it suitable for a very great number of uses; however, it exhibits the drawback of possessing an insufficient impact strength. Attempts were made to obviate such drawback, either by properly modifying the synthesis process or by blending with rubbers.

The modifications to the synthesis process essentially consist in introducing into the propylene stereoregular homopolymerization process one or more copolymerization steps. In particular, it is known that for certain applications it is useful to decrease the crystallinity of the propylene homopolymer by copolymerization of the propylene with small quantities of ethylene and/or α-olefins such as 1-butene, 1-pentene and 1-hexene. In this manner one obtains the so called random crystalline propylene copolymers which, when compared to the homopolymer, are essentially characterized by better flexibility and transparency.

These materials can be used in many application sectors, such as, for example irrigation pipes, pipes for transporting drinking water and other liquid food, heating equipments, single layer bottles (for detergents), multilayer bottles (for beverages and perfumes), single layer or multilayer film for various packaging and rigid food containers.

Propylene random copolymers, however, although they have good transparency, do not offer, especially at low temperatures, sufficiently better impact resistance than the homopolymer which can be satisfactory used for the applications listed above.

It has been known for a long time that the impact resistance of polypropylene can be improved by adding an adequate quantity of elastomeric propylene-ethylene copolymer to the homopolymers by mechanical blending or sequential polymerization. However, this improvement is obtained at the expenses of the transparency of the material.

To avoid this inconvenient, U.S. Pat. No. 4,634,740 suggests the blending of the polypropylene, in the molten state, with propylene-ethylene copolymers obtained with specific catalysts, and having an ethylene content ranging from 70 to 85% by weight. However, said compositions present transparency values (Haze) substantially comparable to those of the propylene homopolymer. Said patent, therefore, does not teach how to obtain compositions having good transparency.

In order to overcome the above mentioned disadvantages the Applicant has previously produced transparent polypropylene compositions offering impact resistance at low temperatures, which can be prepared directly in polymerization (sequential copolymerization). Said compositions, which constitutes the subject of published patent application EP-A-373660, comprise both a crystalline random propylene copolymer, and an elastomeric copolymer of ethylene with propylene and/or $C_4$–$C_8$ α-olefins containing from 20 to 70% by weight of ethylene. According to said patent application, the compositions mentioned above have a good balance of mechanical and chemical-physical properties due to the fact that the value of the content of ethylene of the elastomeric copolymer multiplied by the value of the ratio between the intrinsic viscosity (I.V.) of the elastomeric copolymer soluble in xylene at ambient temperature, and the one of the propylene random copolymer is comprised within a predetermined range.

Published European patent application EP-A-0557953, in the name of the Applicant, describes polyolefin compositions where one obtains a good balance of transparency, stiffness, and impact resistance even at low temperatures, by modifying a crystalline random copolymer of propylene with the proper quantities of a mechanical mixture comprising an elastomeric copolymer and one or more polymers chosen from LLDPE, LDPE and HDPE. In the U.S. Pat. No. 5,994,482 polypropylene alloys for fibers are described, containing two different propylene/ethylene copolymers.

New polypropylene compositions have now been found which have an optimum balance of transparency, stiffness and impact resistance even at low temperatures.

Thus the present invention provides propylene polymer compositions comprising (percent by weight):

A) from 70 to 90%, preferably from 75 to 85%, of a random copolymer of propylene with ethylene, containing from 1 to 6%, preferably from 1.5 to 4%, of ethylene, having a content of fraction insoluble in xylene at room temperature (about 23° C.) of not less than 93%, preferably not less than 94%;

B) from 10% to 30%, preferably from 15% to 25%, of a copolymer of propylene with ethylene, containing from 8 to 18%, preferably from 10 to 18%, of ethylene;

wherein the ratio (B)/$C^2_B$ of the percent by weight of (B), with respect to the total weight of (A) and (B), to the percent by weight of ethylene in (B), with respect to the total weight of (B), represented in the above formula by $C^2_B$, is 2.5 or lower, preferably 2 or lower. The lower limit of said ratio is preferably 0.5.

The term "copolymer" includes polymers containing more than one kind of comonomers. In particular, in addition to ethylene, also one or more $C_4$–$C_{10}$ α-olefin(s) can be present, provided that components A) and B) remain miscible. In fact a preferred feature of the compositions of the present invention is that only one polymer phase (without substantial presence of other immiscible polymer phases) is detected by microscopy analysis. Other preferred features for the compositions of the present invention are:

MFR L (Melt Flow Rate according to ASTM 1238, condition L, i.e. 230° C. and 2.16 kg load) from 0.5 to 50, in particular from 0.5 to 10 g/10 min.; more preferably, in particular for the preparation of bottles and containers (extrusion blow molding), from 0.5 to 2.5, most preferably from 1 to 2.5, for example from 1 to 2 g/10 min.;

Polydispersity Index (PI): 5 or less, more preferably 4 or less;

Intrinsic Viscosity [η] of the fraction (of the overall composition) insoluble in xylene at room temperature: from 1.5 to 3, more preferably from 2 to 2.5 dl/g;

Intrinsic Viscosity [η] of the fraction (of the overall composition) soluble in xylene at room temperature: from 1 to 4.5, more preferably from 1.5 to 4 dl/g;

The compositions of the present invention present at least one melt peak, determined by way of DSC (Differential Scanning Calorimetry), at a temperature higher than 140–145° C. Moreover, the compositions of the present invention preferably have:

a Flexural Modulus of 600 MPa or higher;

Haze (measured on samples containing 2000 ppm DBS, i.e. di-benzylidenesorbitol): 12% or less on 1 mm plaques; 10% or less on 50 μm films;

Gloss (on films): 45% or more;

fraction extractable in hexane (FDA 177, 1520): less than 5%, more preferably less than 3% by weight;

fraction soluble in xylene at room temperature: less than 25%, more preferably less than 20%.

The said $C_4$–$C_{10}$ α-olefins, that may be present as comonomers in the compositions of the present invention, are represented by the formula $CH_2$=CHR, wherein R is an alkyl radical, linear or branched, with 2–8 carbon atoms or an aryl (in particular phenyl) radical. Examples of said $C_4$–$C_{10}$ α-olefins are 1-butene, 1-pentene, 1-hexene, 4-methyl-1-pentene and 1-octene. Particularly preferred is 1-butene.

The compositions of the present invention can be prepared by sequential polymerization in at least two polymerization steps. Such polymerization is carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an Isotacticity Index greater than 90%, preferably greater than 95%. Moreover, said catalysts must have a sensitivity to molecular weight regulators particularly hydrogen) high enough to produce polypropylene having MFR values from less than 1 g/10 min. to 100 g/10 min. or more.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are 1,3-diethers of formula:

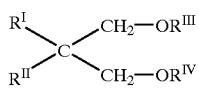

wherein $R^I$ and $R^{II}$ are the same or different and are $C_1$–$C_{18}$ alkyl, $C_3$–$C_{18}$ cycloalkyl or $C_7$–$C_{18}$ aryl radicals; $R^{III}$ and $R^{IV}$ are the same or different and are $C_1$–$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatoms as substitutes for carbon or hydrogen atoms, or both.

Ethers of this type are described in published European patent applications 361493 and 728769.

Representative examples of said diethers are 2-methyl-2-isopropyl-1,3-dimethoxypropane; 2,2-diisobutyl-1,3-dimethoxypropane; 2-isopropyl-2-cyclopentyl-1,3-dimethoxypropane, 2-isopropyl-2-isoamyl-1,3-dimethoxypropane, and 9,9-bis (methoxymethyl) fluorene.

By using the said diethers, the preferred P.I. values mentioned above are obtained directly in polymerization.

Other suitable electron-donor compounds are phthalic acid esters, such as diisobutyl, dioctyl, diphenyl and benzylbutyl phthalate.

The preparation of the above mentioned catalyst components is carried out according to various methods.

For example, a $MgCl_2$·nROH adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The active form of magnesium halide in the solid catalyst component can be recognized by the fact that in the X-ray spectrum of the catalyst component the maximum intensity reflection appearing in the spectrum of the nonactivated magnesium halide (having a surface area smaller than 3 m²/g) is no longer present, but in its place there is a halo with the maximum intensity shifted with respect to the position of the maximum intensity reflection of the nonactivated magnesium dihalide, or by the fact that the maximum intensity reflection shows a width at half-peak at least 30% greater than the one of the maximum intensity reflection which appears in the spectrum of the nonactivated magnesium halide. The most active forms are those where the above mentioned halo appears in the X-ray spectrum of the solid catalyst component.

Among magnesium halides, the magnesium chloride is preferred. In the case of the most active forms of magnesium chloride, the X-ray spectrum of the solid catalyst component shows a halo instead of the reflection which in the spectrum of the nonactivated chloride appears at 2.56 Å.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si-OR bond, where R is a hydrocarbon radical.

Examples of silicon compounds are (tert-butyl)$_2$ Si (OCH$_3$)$_2$, (cyclohexyl) (methyl) Si (OCH$_3$)$_2$, (phenyl)$_2$ Si (OCH$_3$)$_2$ and (cyclopentyl)$_2$ Si (OCH$_3$)$_2$. 1,3-Diethers having the formulae described above can also be used advantageously. If the internal donor is one of these diethers, the external donors can be omitted.

As previously said, the polymerization process can be carried out in at least two sequential steps, wherein components A) and B) are prepared in separate subsequent steps, operating in each step, except the first step, in the presence of the polymer formed and the catalyst used in the preceding step. The catalyst is generally added only in the first step, however its activity is such that it is still active for all the subsequent step(s).

Component A) is preferably prepared before component B).

The regulation of the molecular weight is carried out by using known regulators, hydrogen in particular.

By properly dosing the concentration of the molecular weight regulator in the relevant steps, the previously described MFR and [η] values are obtained.

The whole polymerization process, which can be continuous or batch, is carried out following known techniques and operating in liquid phase, in the presence or not of inert diluent, or in gas phase, or by mixed liquid-gas techniques. It is preferable to carry out the propylene copolymerization step(s) for preparation of component A) in liquid propylene as diluent, and the other polymerization step(s) in gas phase. Generally there is no need for intermediate steps except for the degassing of unreacted monomers.

Reaction time, pressure and temperature relative to the two steps are not critical, however it is best if the temperature is from 20 to 100° C. The pressure can be atmospheric or higher.

The catalysts can be pre-contacted with small amounts of olefins (prepolymerization). The compositions of the present invention can also be obtained by preparing separately the said components A) and B) by operating with the same catalysts and substantially under the same polymerization conditions as previously explained (except that a wholly sequential polymerization process will not be carried out, but the said components and fractions will be prepared in separate polymerization steps) and then mechanically blending said components and fractions in the molten or softened state. Conventional mixing apparatuses, like screw extruders, in particular twin screw extruders, can be used.

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as Flexural Modulus and HDT. Talc can also have a nucleating effect.

The compositions of the present invention are particularly suited for preparing bottles and containers with improved impact strength and excellent optical properties. Such bottles and containers can be monlayer or multilayer, optionally containing layers of other thermoplastic or elastoplastic polymers.

A preferred process for producing said bottles and containers is extrusion blow molding. Such process is well known in the relevant art, and comprises extrusion of a parison which is then blown with gas (air) to adhere to the inside surface of a mould, thereby obtaining the bottle or container.

The particulars are given in the following examples, which are given to illustrate, without limiting, the present invention.

Solid Catalyst Component

The solid catalyst component used in polymerization is a highly stereospecific Ziegler-Natta catalyst component supported on magnesium chloride, prepared as follows.

Into a 500 mL four-necked round flask, purged with nitrogen, 250 mL of TiCl$_4$ were introduced at 0° C. While stirring, 10.0 g of microspheroidal MgCl$_2$*2.8C$_2$H$_5$OH (prepared according to the method described in ex.2 of U.S. Pat. No. 4,399,054 but operating at 3000 rpm instead of 10000 rpm) and 7.4 mmol of 9,9-bis(methoxymethyl) fluorene were added. The temperature was raised to 100° C. and maintained for 120 min. Then, the stirring was discontinued, the solid product was allowed to settle and the supernatant liquid was siphoned off. Then 250 mL of fresh TiCl$_4$ were added. The mixture was reacted at 120° C. for 60 min and, then, the supernatant liquid was siphoned off. The solid was washed six times with anhydrous hexane (6×100 mL) at 60° C. Finally, the solid was dried under vacuum and analyzed. The resulting solid catalyst component contained: Ti=3.5% by weight, 9,9-bis(methoxymethyl)fluorene= 18.1% by weight.

Catalyst System and Prepolymerization Treatment

Before introducing it into the polymerization reactors, the solid catalyst component described above is contacted at 15° C. for 30 minutes with aluminum triethyl (TEAL) in such quantity that the TEAL/Ti molar ratio be equal to 300.

The catalyst system is then subjected to prepolymerization by maintaining it in suspension in liquid propylene at 20° C. for about 9 minutes before introducing it into the first polymerization reactor.

EXAMPLES 1–2

Methods of analysis used.

The data shown in the following Table are obtained by using the following test methods.

Melt Flow Rate MFR

Determined according to ASTM D 1238, condition L.

Ethylene content of the polymers (C2 content)

Determined by IR. spectroscopy.

Molar ratios of the feed gases

Determined by gas-chromatography.

Flexural Modulus

Determined according to ISO 178.

Ductile/Brittle transition temperature (D/B)

Determined according to internal method MA 17324, available upon request.

According to this method, the bi-axial impact resistance is determined through impact with an automatic, computerised striking hammer.

The circular test specimens are obtained by cutting with circular hand punch (38 mm diameter). They are conditioned for at least 48 hours at 23° C. and 50 RH and then placed in a thermostatic bath at testing temperature for 1 hour.

The force-time curve is detected during impact of a striking hammer (5.3 kg, hemispheric punch with a ½" diameter) on a circular specimen resting on a ring support. The machine used is a CEAST 6758/000 type model no. 2.

D/B transition temperature means the temperature at which 50% of the samples undergoes fragile break when submitted to the impact of a falling hammer having a predetermined weight and falling from a predetermined height.

Preparation of the plague specimens

Plaques for DIB measurement, having dimensions of 127×127×1.5 mm are prepared according to internal method MA 17283; plaques for Haze measurement, 1 mm thick, are prepared by injection moulding according to internal method MA 17335 with injection time of 1 second, temperature of 230° C., mould temperature of 40° C., description of all the said methods being available upon request.

Method MA 17283

The injection press is a Negri Bossi type (NB 90) with a clamping force of 90 tons. The mould is a rectangular plaque (127×127×1.5 mm).

The main process parameters are reported below:

| | |
|---|---|
| Back pressure (bar): | 20 |
| Injection time (s): | 3 |
| Maximum Injection pressure (MPa): | 14 |
| Hydraulic injection pressure (MPa): | 6–3 |
| First holding hydraulic pressure (MPa): | 4 ± 2 |
| First holding time (s): | 3 |
| Second holding hydraulic pressure (MPa): | 3 ± 2 |
| Second holding time (s): | 7 |
| Cooling time (s): | 20 |
| Mould temperature (° C.): | 60 |

The melt temperature is between 220 and 280° C.

Method MA 17335

The injection press is a Battenfeld type BA 500CD with a clamping force of 50 tons.

The insert mould leads to the moulding of two plaques (55×60×1 mm each).

Haze on plague

Determined according to internal method MA 17270, available upon request.

The plaques are conditioned for 24 hours at R.H. 50±5% and 23±1° C.

The apparatus used is a Hunter D25P-9 colorimeter. The measurement and computation principle are given in the norm ASTM-D1003.

The apparatus is calibrated without specimen, the calibration is checked with a haze standard. The haze measurement is carried out on five plaques.

Haze on film

Determined on 50 μm thick films of the test composition, prepared as described below. The measurement is carried out on a 50×50 mm portion cut from the central zone of the film.

The instrument used for the test is a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze).

Preparation of the film specimens

Some films with a thickness of 50 μm are prepared by extruding each test composition in a single screw Collin extruder (length/diameter ratio of screw: 25) at a film drawing speed of 7 m/min. and a melt temperature of 210–250° C. Each resulting film is superimposed on a 1000 μm thick film of a propylene homopolymer having an isotacticity index of 97 and a MFR L of 2 g/10 min. The superimposed films are bonded to each other in a Carver press at 200° C. under a 9000 kg load, which is maintained for 5 minutes.

The resulting laminates are stretched longitudinally and transversally, i.e. biaxially, by a factor 6 with a TM Long film stretcher at 150° C., thus obtaining a 20 μm thick film (18 μm homopolymer+2 μm test composition). 2×5 cm specimens are cut from the films.

Gloss on film

Determined on the same specimens as for the Haze.

The instrument used for the test is a model 1020 Zehntner photometer for incident measurements. The calibration is made by carrying out a measurement at incidence angle of 60° on black glass having a standard Gloss of 96.2% and a measurement at an incidence angle of 45° on black glass having a standard Gloss of 55.4%.

Characteristics of the bottles

Weight: 35 g;

Height: 240 mm;

Bottom diameter: 38 mm;

Opening diameter: 33 mm.

Such bottles are prepared by extrusion blow molding.

Breakage height at +4° C.

Standard test method for drop impact resistance of blow molded thermoplastic containers. ASTM D 2463-95.

Procedure B. to be calibrated and validated vs. the primary or "projector" procedure described above.

Hexane soluble on film

Determined according to FDA 177, 1520, by suspending in an excess of hexane a 100 μm thick film specimen of the composition being analyzed, in an autoclave at 50° C. for 2 hours. Then the hexane is removed by evaporation and the dried residue is weighed.

Melting temperatures crystallization temperature and melting enthalpy

Determined by DSC (Differential Scanning Calorimetry).

Xylene soluble and insoluble fractions

Determined as follows.

2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for fiber 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained.

The weight percentage of polymer soluble in xylene at room temperature is then calculated. The percent by weight of polymer insoluble in xylene at room temperature is considered the Isotacticity Index of the polymer. This value corresponds substantially to the Isotacticity Index determined by extraction with boiling n-heptane, which by definition constitutes the Isotacticity Index of polypropylene.

Intrinsic Viscosity (I.V.)

Determined in tetrahydronaphthalene at 135° C.

The polymerization process conditions and the characteristics of the products of the invention are shown in the Table Polymerization The polymerization runs were conducted in continuous in a series of two reactors equipped with devices to transfer the product from one reactor to the one immediately next to it. The first reactor is a liquid phase reactor, and the second is a fluid bed gas phase reactor.

Unless otherwise specified, temperature and pressure were maintained constant throughout the course of the reaction. Hydrogen was used as molecular weight regulator.

The gas phase (propylene, ethylene and hydrogen) is continuously analyzed via gas-chromatography.

At the end of the run the powder was discharged, stabilized following known techniques, dried in an oven at 60° C. under a nitrogen flow and pelletized.

The product may be nucleated by adding 2000 ppm of DBS (di-benzylidenesorbitol), prior to pelletizing. Such addition is carried out in particular on the samples to be subjected to Haze measurements.

TABLE

|  |  | Ex. 1 | Ex. 2 |
|---|---|---|---|
| L.P.R. |  |  |  |
| Temperature | ° C. | 75 | 70 |
| MFR "L" | g/10' | 1.7 | 2.2 |
| C2 content (polymer) | wt % | 2.5 | 2.8 |
| Xylene insoluble | wt % | 94.7 | 94.7 |
| Split (A) | wt % | 81 | 81 |
| G.P.R. |  |  |  |
| Temperature | ° C. | 80 | 85 |
| Pressure | Mpa | 1.6 | 1.6 |
| C2—/(C2— + C3—) | mol | 0.08 | 0.09 |
| Split (B) | wt % | 19 | 19 |
| FINAL PRODUCT |  |  |  |
| MFR "L" | g/10' | 1.30 | 1.7 |
| Flexural modulus | MPa | 715 | 740 |
| D/B transition temperature | ° C. | −7 | −4 |
| Haze, 1 mm plaque | % | 10.1 | 9.8 |
| Haze, film | % | 8.2 | 7.1 |
| Gloss, film | % | 51 | 60 |
| Fish eyes |  |  |  |
| >0.2 mm | No/m² | — | 400 |
| ≧0.1 mm | No/m² | 70 | — |
| 1.5/2.5 mm | No/m² | 1 | — |
| 0.5–0.7 mm | No/m² | 10 | 30 |
| 0.7–1.5 mm | No/m² | 8 | 3 |
| >1.5 mm | No/m² | — | 0 |
| Bottles (35 g) |  |  |  |
| Breakage height at +4° C. | cm | 186 | 161 |
| Top load | N | 260 | 287 |
| Haze | % | 21.8 | 17.8 |
| Fish eyes total (20 bottles) | No | 36 | 8 |
| Fish eyes >1 mm | No | 0 | 0 |
| Hexane soluble film | wt % | 1.70 | 2.00 |
| DSC Melting temperature | ° C. | 149.7 | 149.7 |
| DSC Cryst. temperature | ° C. | 113.7 | 114.8 |
| DSC Melting enthalpy | J/g | 73.7 | 71.2 |
| Xylene soluble | wt % | 13.4 | 13.0 |
| Xylene insoluble | wt % | 85.2 | 85.8 |
| Acetone soluble | wt % | 1.4 | 1.2 |
| X.S. I.V. | dl/g | 3.6 | 1.8 |
| X.I. I.V. | dl/g | 2.3 | 2.2 |
| I.V. total | dl/g | 2.4 | 2.1 |
| C2 content (polymer) | wt % | 5.3 | 4.8 |
| (B)/C²$_B$ |  | 1.1 | 1.4 |

Notes to the table.
L.P.R. = Liquid Phase Reactor;
Split = weight fraction of polymer produced in the specified reactor;
G.P.R. = Gas Phase Reactor;
C2—/(C2— + C3—) = molar ratio of fed ethylene to fed ethylene plus fed propylene;
I.V. = Intrinsic Viscosity;
X.S. I.V. = Intrinsic Viscosity of Xylene Soluble fraction;
X.I. I.V. = Intrinsic Viscosity of Xylene Insoluble fraction.

What is claimed is:

1. Propylene polymer compositions comprising percent by weight):

A) from 70 to 90% of a random copolymer of propylene with ethylene, containing from 1 to 6% of ethylene, having a content of fraction insoluble in xylene at room temperature (about 23° C.) of not less than 93%;

B) from 10% to 30% of a copolymer of propylene with ethylene, containing from 8 to 18% of ethylene;

wherein the ratio (B)/C²$_B$ of the percent by weight of (B), with respect to the total weight of (A) and (B), to the percent by weight of ethylene in (B), with respect to the total weight of (B), represented in the above formula by C²$_B$, is 2.5 or lower.

2. The propylene polymer compositions of claim 1, having a MFR L of from 0.5 to 50 g/10 min.

3. Polymerization process for preparing the propylene polymer compositions of claim 1, comprising at least two sequential steps, wherein components A) and B) are prepared in separate subsequent steps, operating in each step, except the first step, in the presence of the polymer formed and the catalyst used in the preceding step.

4. Bottles and containers comprising the propylene polymer compositions of claim 1.

5. Bottles and containers comprising the propylene polymer compositions as defined in claim 1, said compositions having a MFR L of from 0.5 to 2.5 g/10 min.

6. The bottles and containers of claim 5, obtained by extrusion blow molding.

* * * * *